(12) United States Patent
Sawamura

(10) Patent No.: US 8,367,927 B2
(45) Date of Patent: *Feb. 5, 2013

(54) WATERPROOFING METHOD FOR WIRE AND WIRE HAVING WATERPROOF PART FORMED BY THE WATERPROOFING METHOD

(75) Inventor: Naohito Sawamura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 181 days.

This patent is subject to a terminal disclaimer.

(21) Appl. No.: 12/747,983

(22) PCT Filed: Jun. 30, 2008

(86) PCT No.: PCT/JP2008/061811
§ 371 (c)(1),
(2), (4) Date: Jun. 14, 2010

(87) PCT Pub. No.: WO2009/078189
PCT Pub. Date: Jun. 25, 2009

(65) Prior Publication Data
US 2011/0048762 A1   Mar. 3, 2011

(30) Foreign Application Priority Data
Dec. 19, 2007   (JP) ................................. 2007-327833

(51) Int. Cl.
*H01R 43/00* (2006.01)
(52) U.S. Cl. .................................... 174/23 R; 174/77 R
(58) Field of Classification Search ............... 174/23 R, 174/78, 77 R, 74 R, 84 C
See application file for complete search history.

(56) References Cited

U.S. PATENT DOCUMENTS

| | | | | |
|---|---|---|---|---|
| 4,434,320 A | * | 2/1984 | Klein et al. | 174/23 R |
| 5,347,090 A | * | 9/1994 | Cerda | 174/84 R |
| 7,053,307 B2 | * | 5/2006 | Kossak et al. | 174/84 R |
| 7,612,287 B2 | * | 11/2009 | Ichikawa et al. | 174/77 R |
| 2004/0238200 A1 | * | 12/2004 | Tanaka et al. | 174/74 R |
| 2010/0212936 A1 | * | 8/2010 | Arai | 174/23 R |

FOREIGN PATENT DOCUMENTS

| | | |
|---|---|---|
| JP | 2002-044837 | 2/2002 |
| JP | 2005080483 | 3/2005 |
| JP | 2006-228709 | 8/2006 |
| JP | 2007-134054 | 5/2007 |
| JP | 2007-287647 | 11/2007 |
| JP | 2007-305525 | 11/2007 |

* cited by examiner

Primary Examiner — Chau Nguyen
(74) Attorney, Agent, or Firm — Gerald E. Hespos; Michael J. Porco (57) ABSTRACT

A waterproofing method is provided for a wire to be arranged in a water susceptible area of a vehicle. An insulating coating layer is removed in a lengthwise intermediate part of the wire to expose a core. A heat shrinkable tube with an inner layer made of a hot-melt waterproofing agent is mounted on the exposed core section and parts of the insulating coating layer adjacent to the exposed core section and heated. As a result, the hot-melt waterproofing agent of the inner layer is melted and infiltrates into clearances between strands of the exposed core section. In addition, negative pressure is introduced into the inside of the insulating coating layer from an end of the wire, thereby sucking the waterproofing agent into the inside of the insulating coating layer to infiltrate the waterproofing agent also between the strands of the core inside the insulating coating layer.

5 Claims, 9 Drawing Sheets

WATERPROOFING METHOD FOR WIRE AND WIRE HAVING WATERPROOF PART FORMED BY THE WATERPROOFING METHOD

BACKGROUND OF THE INVENTION

1. Field of the Invention

The present invention relates to a wire waterproofing method and a wire having a waterproof part formed by the waterproofing method and is particularly designed to be able to apply a waterproof treatment at an arbitrary position of a wire arranged in a water susceptible area of a vehicle.

2. Description of the Related Art

Conventionally, if a wiring harness is arranged along a water susceptible area of a vehicle such as a car or a motorcycle, a ground terminal is crimped and connected to an end of a ground wire of the wiring harness and grounded by being bolted to a vehicle body in many cases. In this case, if the fixed position of the ground terminal is located in a water susceptible area, water enters the inside of the ground wire through an exposed core section crimped and connected to the ground terminal and penetrates to the other end of the ground terminal through clearances of a core made up of a multitude of strands and covered by an insulating coating layer. In this case, a terminal connected to the other end of the ground wire is often inserted and locked in a connector and the penetrating water also enters the connector at the other end of the ground wire, which causes a problem of corroding the terminal in the connector.

For the above problem, various ground wire waterproof treatments have been conventionally proposed.

Figure 11:
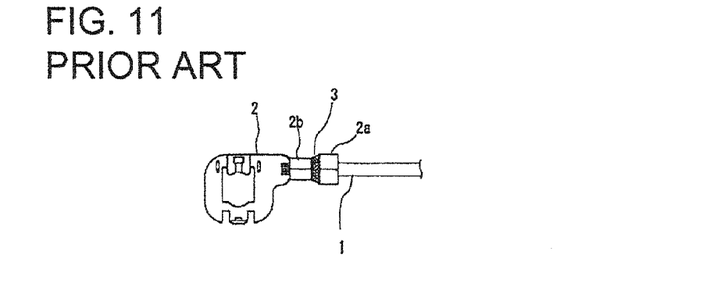
FIG. 11 is a diagram showing a prior art.

For example, the present applicant proposed to drop a waterproofing agent between an insulating coating barrel 2a and a core barrel 2b of a ground terminal 2 crimped and connected to an end of a ground wire 1 as shown in FIG. 11 of Japanese Unexamined Patent Publication No. 2006-228709, and air inside an insulating coating layer is sucked from the other end of the ground wire 1 to reduce pressure. In this way, the dropped waterproofing agent 3 is infiltrated into the inside of the insulating coating layer to fill clearances of a core made up of a plurality of strands, thereby preventing water penetration from a connecting portion with the ground wire 2 into the inside of the ground wire 1.

Figure 12A:
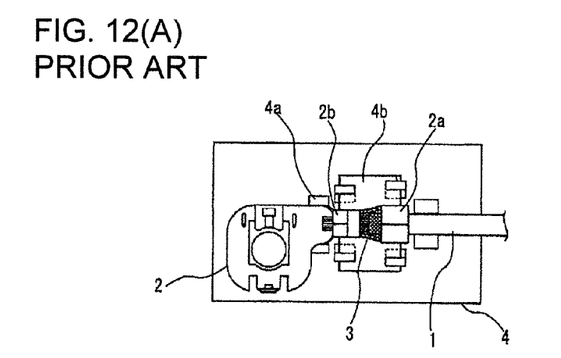
FIGS. 12(A) and 12(B) are diagrams showing another prior art.
Figure 12B:
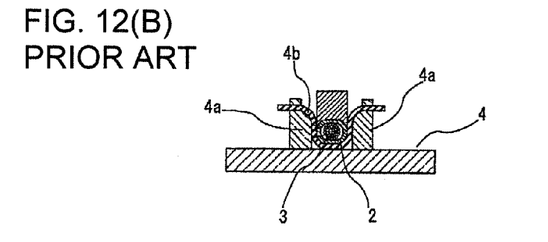

Also in Japanese Unexamined Patent Publication No. 2007-13405, a waterproofing agent is dropped to a ground terminal at an end of a ground wire and air inside the ground wire is sucked to infiltrate the waterproofing agent into the inside of the ground wire by a similar method. In JP 2007-13405, a leakage preventing wall 4b is arranged between both side walls 4a of a jig 4 and the waterproofing agent 3 is dropped with the leakage preventing walls 4b held in close contact with opposite side surfaces of the ground terminal 2 as shown in FIG. 12 in order to position the ground terminal 2 and prevent the lateral leakage of the waterproofing agent.

As described above, in each of the waterproofing methods of JP 2006-228709 and JP 2007-13405, the waterproofing agent is dropped to the exposed core section of the ground terminal at the end of the ground wire and a waterproofed position by the waterproofing agent is located at the ground terminal at the end of the ground wire. In other words, it is supposed that the ground terminal is crimped and connected to the end of the ground wire and the ground terminal is bolted to a body panel. In order to apply a waterproof treatment to the ground wire in this way, the ground terminal to be fixed to the vehicle needs to be crimped and connected to the end of the ground wire and, depending on vehicles, it is difficult in some cases to ensure a place where the ground terminal is fixed. In such a case, the ground wire has to be extended up to the place where the ground terminal can be fixed and unnecessary handling of the ground wire is required. In addition, if the ground wire is unnecessarily made longer, a possibility of the ground wire being interfered with and damaged by an external interfering member is increased by that much. Even if a waterproof treatment is applied at an end position connected with the ground terminal, water may enter at a damaged position and penetrate to a connector connecting portion at the other end of the ground wire if the ground wire is damaged at an intermediate position.

Further, the jig for positioning the ground terminal and preventing the leakage of the dropped waterproofing agent is necessary at the time of dropping the waterproofing agent to the ground terminal as disclosed in JP 2007-134054. Since this jig needs to be provided for each size of ground terminals, equipment cost increases, which leads to an increase of production cost. In view of these points, there is a room for improvement.

In view of the above problems, an object of the present invention is to reliably prevent water penetration into a connector connecting portion by applying a waterproof treatment not at a fixed position of a ground terminal to be bolted to a vehicle body, but at an arbitrary position of a wire to be arranged in a water susceptible area, thereby enabling the waterproof treatment to be applied at as close a position as possible to the wire connected to a connector without using a jig.

SUMMARY OF THE INVENTION

The present invention is directed to a wire waterproofing method for a wire to be arranged in a water susceptible area of a vehicle. The wire is such that a core made up of a plurality of strands is covered by an insulating coating layer. The insulating coating layer is removed in a lengthwise intermediate part of the wire to expose the core. One of the following steps (1) to (4) then is performed: (1) an intermediate crimping terminal is crimped and connected to the strands of the exposed core section, (2) the strands of the exposed core section are welded by ultrasonic welding, (3) the strands of the exposed core section are welded by resistance welding and (4) soldering is applied to the strands of the exposed core section. A heat shrinkable tube with an inner layer made of a hot-melt waterproofing agent and an outer layer is, thereafter, mounted on the exposed core section and parts of the insulating coating layer adjacent to the exposed core section. The heat shrinkable tube is heated to melt the hot-melt waterproofing agent of the inner layer and infiltrate the waterproofing agent into clearances between the strands of the exposed core section, and negative pressure is introduced into the inside of the insulating coating layer from an end of the wire to suck the waterproofing agent into the inside of the insulating coating layer and infiltrate the waterproofing agent also between the strands of the core inside the insulating coating layer.

Specifically, if the wire to be waterproofed at an intermediate position is a ground wire and a ground terminal is connected with an end of the ground wire opposite to a connector connecting side and bolted to a vehicle body to be grounded, a waterproof treatment is not applied at the position of the ground terminal as disclosed in JP 2006-228709 and JP 2007-13405 and is instead applied at an arbitrary position between both ends of the ground wire, preferably at a position close to the end at a connector connecting side.

The negative pressure may be introduced from one end of the wire. The negative pressure is preferably introduced from the end of the wire at the connector connecting side in the case of a ground wire. Even if the negative pressure is introduced from a ground terminal connecting side, the molten waterproofing agent of the inner layer of the heat shrinkable tube can be filled into the clearances between the strands to block water penetration at the filled position. Thus, the negative pressure may be introduced from either side.

The wire to be waterproofed according to the present invention is not limited to a ground wire and may be a power wire or a signal wire to be arranged in a water susceptible area and desired to be waterproofed.

Since the above wire waterproofing method of the present invention can apply the waterproof treatment to the lengthwise intermediate part of the wire, unnecessary handling of the wire can be dispensed with and water penetration into a connector can be more reliably prevented by applying the waterproof treatment at the intermediate position of the wire close to the connector connecting side.

Particularly, an advantage of being able to apply a waterproof treatment at an arbitrary intermediate position of a wire is large for wiring harnesses to be arranged in motorcycles since the motorcycles have smaller arrangement spaces for wiring harnesses and include more water susceptible areas than cars.

In addition, it is sufficient to remove the insulating coating layer at the intermediate part of the wire to be waterproofed and heat the heat shrinkable tube with the inner layer after mounting it on the exposed core section and the parts of the insulating coating layer adjacent to the exposed core section. Thus, it is not necessary to provide a jig for positioning the part to be waterproofed and preventing the leakage of the waterproofing agent as in JP 2006-228709 and JP 2007-134054 and, therefore, a waterproof treatment can be inexpensively applied.

As described above, the strands of the exposed core section are fastened by crimping and connecting the intermediate crimping terminal or welded by resistance welding or soldered and, thereafter, the heat shrinkable tube is mounted on the exposed core section and heated.

In the case of applying the waterproof treatment at the intermediate position of the wire according to the present invention, if the strands of the exposed core section are fastened by crimping and connecting the intermediate crimping terminal, the clearances between the strands can be reliably eliminated and water passing in the clearances between the strands can be reliably blocked at the crimped position of the intermediate crimping terminal.

Also in the case of welding by ultrasonic welding or resistance welding or soldering instead of the crimping of the intermediate crimping terminal, the clearances between the strands can be reliably eliminated to reliably block water penetration.

Thus, if the intermediate crimping terminal is, for example, crimped and connected to a ground wire as a waterproof treatment, water penetration from a ground terminal to a connector connecting side can be reliably blocked at the crimped position of the intermediate crimping terminal.

The exposed core section exposed by removing the insulating coating layer is often formed by forming a slit in the insulating coating layer and moving a part of the insulating coating layer at one side of the slit. In such a case, the moved part of the insulating coating layer returns due to its resiliency to shorten a distance to the exposed core section. Thus, if the intermediate crimping terminal is crimped and connected to the exposed core section, the molten waterproofing agent of the inner layer of the heat shrinkable tube can be retained in a waterproofing agent reservoir between the intermediate crimping terminal and the other part of the insulating coating layer that was not moved and the leakage of the molten waterproofing agent from the opposite longitudinal ends of the heat shrinkable tube can be suppressed.

Further, the molten waterproofing agent can be sufficiently infiltrated into the inside of the part of the insulating coating layer at one side where the infiltration is necessary and reliably filled into the clearances between the strands inside this part of the insulating coating layer.

Further, if the both sides of the intermediate crimping terminal need to be waterproofed, the parts of the wire at the opposite sides of the intermediate crimping terminal can be reliably waterproofed by introducing negative pressure from the other end of the wire.

An intermediate crimping terminal to be crimped and connected to the exposed core section needs not be a dedicated or individual intermediate crimping terminal and can be commonly used even if materials and thicknesses of insulated coating layers differ if strand constructions of cores are substantially same. In this respect, parts cost and equipment cost can be reduced more than in the case of a waterproof treatment at a ground terminal where a different jig needs to be used if the size of the ground terminal differs.

Particularly, in the case of welding such as ultrasonic welding or resistance welding or soldering, the clearances between the strands can be reliably eliminated regardless of the strand construction of the core.

For example, a multilayer tuber composed of an inner layer tube made of a hot-melt adhesive resin including a hot-melt polyolefin resin and an outer layer tube made of a soft resin including an electron-beam cross-linking polyolefin resin is preferably used as the heat shrinkable tube with the inner layer. A "Sumitube™ W" produced by Sumitomo Electric Fine Polymer, Inc. is preferably used as this heat shrinkable tube.

A heat shrinkage temperature of the heat shrinkable tube with the inner layer is 115° C. or higher, an inner diameter shrinking rate thereof is 60% or higher and a length changing rate thereof is 15% or higher. Thus, the length of the heat shrinkable tube mounted to cover the exposed core section is set such that the heat shrinkable tube is located on the exposed core section and also on the outer circumferential surfaces of the parts of the insulating coating layer adjacent to the opposite ends of the exposed core section in a shrunk state.

The heat shrinkable tube with the inner layer is not limited to the one in which the outer layer and the inner layer are united beforehand. A heat shrinkable outer layer tube and an inner layer tube made of a hot-melt adhesive resin may be individually prepared, and the heat shrinkable outer layer tube may be mounted after the inner layer tube is first mounted on a wire group in a water susceptible area, thereby mounting the inner and outer layer tubes one over another.

The present invention is also directed to a wire comprising a waterproof part formed by the above waterproofing method.

The wire of the present invention including the waterproof part at an intermediate position can be used as a wire to be arranged in a water susceptible area, but is most preferably applicable when the wire is a ground wire.

For example, if the wire is a ground wire having one end connected with a ground terminal and the other end connected with a connector connecting terminal and the ground terminal is to be fixed to a body panel in a water susceptible area, the waterproof part formed by the waterproofing method is provided at an intermediate position close to a connector connecting portion at the other end of the ground wire, and negative pressure is introduced from an end at the side of the connector connecting portion to infiltrate and fill the waterproofing agent into clearances between strands inside an insulating coating layer at a connector connecting side.

If the wire is a power wire, a signal wire or a ground wire having one end connected with a connector connecting terminal and spliced to another wire in a water free area and a connector connecting terminal is connected with an end of the spliced other wire, the waterproof part is provided at an intermediate position between a spliced position and the end connected with the connector connecting terminal, and the waterproofing agent is filled into the exposed core section of the waterproof part and between the strands inside the insulating coating layer parts at the opposite sides of the exposed core section.

If the above construction is employed, water may penetrate to the spliced side unless a waterproof treatment is applied to a side of the waterproof part toward the spliced position. By applying the waterproof treatment to the both sides, water penetration to the other wire spliced in the water free area can be reliably blocked and no waterproof treatment is necessary at the spliced portion.

Further, if the wire is a signal wire, a power wire or a ground wire having both ends connected with connector connecting terminals, the connector connecting terminal at one end is connected with an electronic control unit, the connector connecting terminal at the other end is a device controlled by the electronic control unit and the electronic control unit and the device are arranged in a water susceptible area, a waterproof part formed by the waterproofing method is provided at an intermediate position of the wire close to the electronic control unit and a waterproof cover is mounted on the device and a connecting portion of the wire.

An existing non-waterproof device is often used as the device (e.g. light switch) controlled by the electronic control unit. In such a case, it is preferable to mount a resin molded cover or a rubber cover on a wire end beforehand and mount this preventive cover on the wire end and a connector connecting portion of the device to prevent water penetration into the device.

If a plurality of devices are connected with the electronic control unit, ends of wires connected via the waterproof part are connected with the electronic control unit.

If both an electronic control unit and a plurality of devices controlled by the electronic control unit are arranged in a water susceptible area, a wire connected with the electronic control unit and wires connected with the plurality of devices are connected by a waterproof connector and the waterproof part is provided at a position of the wire closer to the electronic control unit than the connected position by the waterproof connector. Then, water penetration to the electronic control unit can be prevented even if the waterproof connector is broken.

Since the waterproof part is covered by the outer layer tube of the heat shrinkable tube, it may not be wrapped around by a waterproof sheet or a waterproof tape. However, a waterproof sheet or a waterproof tape may be mounted to increase a protective function of the waterproof part.

As described above, in the wire waterproofing method of the present invention, the waterproof treatment can be applied at an arbitrary lengthwise position of the wire, thereby increasing a degree of freedom in design. In addition, since no waterproof treatment needs to be applied at the position of the ground terminal as disclosed in JP 2006-228709 and JP 2007-13405, the waterproof treatment can be applied without necessarily requiring a ground terminal to be fixed to a body panel and unnecessary handling of the wire can be dispensed with. Further, since the waterproof part can be formed at the intermediate position close to the connector connecting side where the waterproof treatment is necessary, the connector connecting side can be waterproofed with increased reliability.

If the heat shrinkable tube with the inner layer made of the hot-melt waterproofing agent is mounted at the intermediate position to cover the wire and heated to melt the waterproofing agent, the molten waterproofing agent is infiltrated into the clearances between the strands at the time of introducing the negative pressure. Thus, it is not necessary to drop the waterproofing agent and a jig for positioning the ground terminal and a jig for preventing the leakage of the waterproofing agent as disclosed in JP 2007-13405 become unnecessary, wherefore equipment cost for the waterproof treatment can be reduced.

If the exposed core section to be waterproofed is fastened by crimping and connecting an intermediate crimping terminal, by being welded or by being soldered, the clearances between the strands of the core can be reliably eliminated in this crimped portion. Thus, in the case of a ground wire, water penetration from a ground terminal can be reliably blocked at the crimped position of the intermediate crimping terminal.

DETAILED DESCRIPTION OF THE PREFERRED EMBODIMENTS

Hereinafter, embodiments of the present invention are described with reference to the drawings.

FIGS. 1 to 4 show a reference embodiment.

In the reference embodiment, a wire 10 for a ground circuit arranged in a water susceptible area is provided with a waterproof part 11.

Figure 1A:
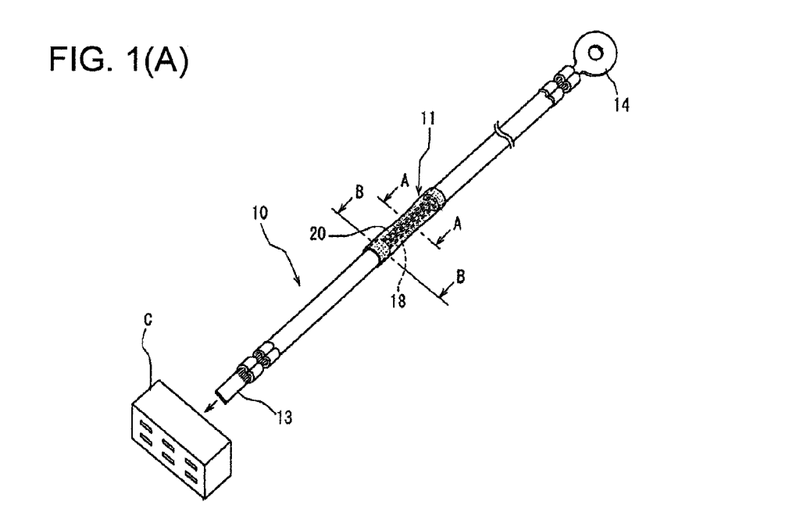
FIG. 1(A) is an overall view of a wire including a waterproof part according to a reference embodiment of the invention and FIG. 1(B) is an enlarged view of the waterproof part with a waterproof sheet removed.
Figure 1B:
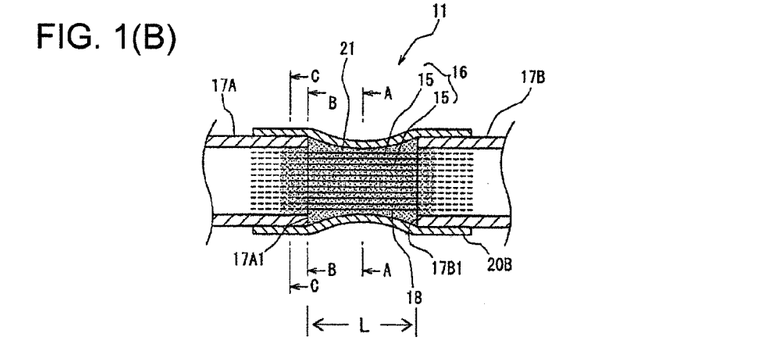

The wire 10 has one end crimped and connected to a terminal 13, which is to be inserted and locked in a connector C, and the other end crimped and connected to a ground terminal 14. The waterproof part 11 is formed at an intermediate position closer to the connector connecting terminal 13 than to the ground terminal 14.

Figure 2A:
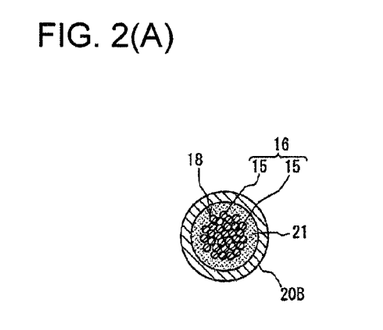
FIG. 2(A) is a section along A-A of FIG. 1(B)
Figure 2B:
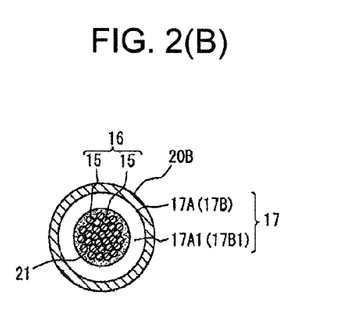
FIG. 2(B) is a section along B-B of FIG. 1(B) and FIG. 2(C) is a partial enlarged section along C-C of FIG. 1(B), FIGS. 3(A) and 3(B) are sections showing a heat shrinkable tube.
Figure 2C:
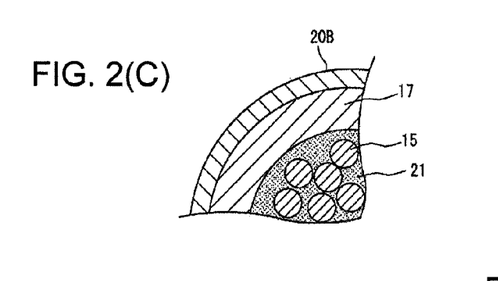

As shown in FIG. 2(B), the wire 10 is composed of a core 16 formed by twisting a multitude of strands 15 and an insulating coating layer 17 surrounding the core 16 and made of insulating resin.

Figure 4A:
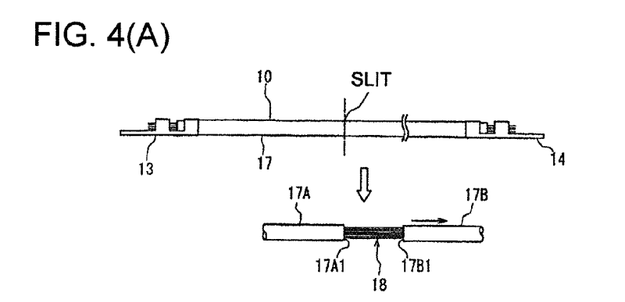
FIGS. 4(A) to 4(D) are diagrams showing a process of forming the waterproof part according to the reference embodiment.

In the waterproof part 11 of the wire 10, a slit is formed in the insulating coating layer 17 and an insulating resin layer 17B at a side of the slit toward the ground terminal is moved to form an exposed core section 18 having the insulating resin layer removed between a slit end surface 17B1 of the insulating resin layer 17B and a slit end surface 17A1 of an insulating resin layer 17A at the other side as shown in FIG. 4(A).

Figure 3A:
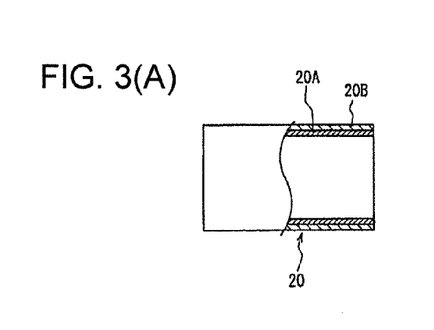
Figure 3B:
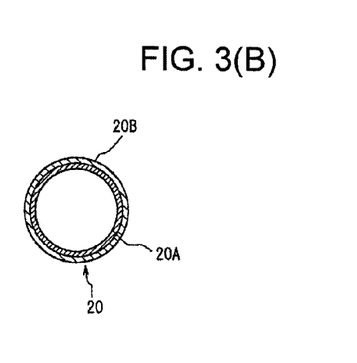

A heat shrinkable tube 20 with an inner layer is mounted to cover the entire length of the exposed core section 18 and the insulating resin layers 17A, 17B at the opposite sides of the exposed core section 18 by a specified length L from the slit end surfaces 17A1, 17B1. As shown in FIG. 3, the heat shrinkable tube 20 is a multilayer tube composed of an inner layer tube 20A made of a hot-melt waterproofing agent including a hot-melt polyolefin resin and an outer layer tube 20B made of an electron-beam cross-linking soft polyolefin resin. A shrinkage temperature of the heat shrinkable tube 20 is 115° C. or higher. When the heat shrinkable tube 20 is heated to this temperature or higher, the inner layer tube 20A is melted and a molten waterproofing agent 21 flows from the outer layer tube 20B. Since an inner diameter shrinking rate of the heat shrinkable tube 20 is 60% or higher, the heat shrinkable tube 20 can be shrunk to be held in close contact with the outer circumferential surface of the exposed core section having the insulating coating layer removed at the time of thermal shrinkage even without being forcibly mounted in a radially expanded state on the outer circumferential surface of the insulating coating layer 17 at the time of being mounted on the exposed core section 18 and the insulating coating layers 17A, 17B at the opposite sides.

Although the inner layer tube 20A and the outer layer tube 20B are integral in the heat shrinkable tube 20 with the inner layer of this embodiment, an inner layer tube and an outer layer tube may be separate and the inner layer tube may be made of a resin which becomes a hot-melt waterproofing agent that is melted at a specified temperature.

In this case, the inner layer tube is first mounted on a place where the heat shrinkable tube 20 with the inner layer is to be mounted and, then, the outer layer tube is mounted.

At the same time as the heat shrinkable tube 20 is heated to the shrinkage temperature to shrink the outer layer tube 20B, the inner layer tube 20A is melted to become the molten waterproofing agent 21. This molten waterproofing agent 21 is infiltrated into clearances between the strands 15 of the exposed core section 18. In addition, the waterproofing agent 21 is infiltrated into the insides of the insulating resin layers 17A, 17B at the opposite ends of the exposed core section 18 from the slit end surfaces 17A1, 17B1, thereby filling the waterproofing agent 21 also in clearances between the strands 15 of the core 16 inside these insulating coating layers 17A, 17B.

Next, a method for forming the waterproof part 11 is described with reference to FIG. 4.

As shown in FIG. 4(A), the wire 10 having the one end crimped and connected to the connector connecting terminal 13 and the other end crimped and connected to the ground terminal 14 has the insulating coating layer 17 removed at a required position as described above, thereby forming the exposed core section 18.

Figure 4B:
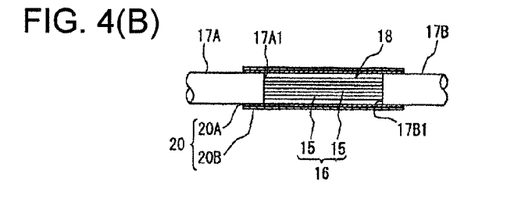

Subsequently, as shown in FIG. 4(B), the heat shrinkable tube 20 is mounted to cover the exposed core section 18 and the insulating coating layers 17A, 17B at the opposite sides by the specified distance from the slit end surfaces.

Figure 4C:
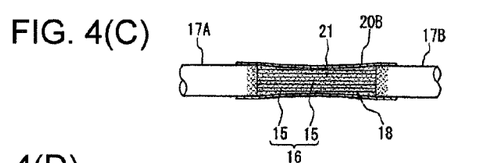

Subsequently, as shown in FIG. 4(C), the heat shrinkable tube 20 is heated to the shrinkage temperature to shrink the outer layer tube 20B and, at the same time, melt the inner layer tube 20A, whereby the molten waterproofing agent 21 is infiltrated into the clearances between the strands 15 of the exposed core section 18 and applied to the entire outer circumferential surface of the exposed core section 18. The molten waterproofing agent has such a viscosity as to be fluid (e.g. about 0.6 Pa·s).

Figure 4D:
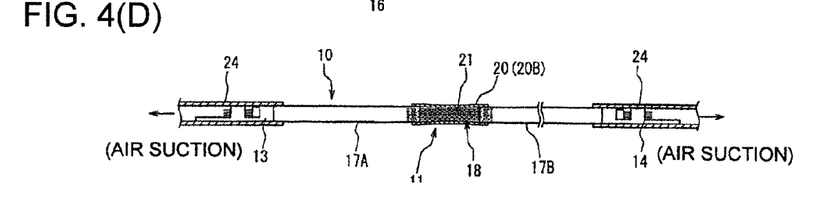

Subsequently, as shown in FIG. 4(D), negative pressure is introduced to the insides of the insulating coating layers 17A, 17B from the opposite ends of the wire 10 at the same time as the heat shrinkable tube 20 is heated or after the heat shrinkable tube 20 is heated and the waterproofing agent 21 becomes fluid.

Specifically, the opposite ends of the wire 10 are inserted into and coupled to air suction hoses 24 connected with a suction pump, air between the strands 15 inside the insulating coating layers 17A, 17B is sucked to reduce pressure from exposed core sections of the terminals 13 and 14 exposed between core barrels and insulating coating barrels.

By reducing pressure inside the insulating coating layers 17A, 17B, the waterproofing agent 21 infiltrated into the clearances between the strands 15 of the exposed core section 18 is sucked and infiltrated into the insides of the insulating coating layers 17A, 17B from the slit end surfaces 17A1, 17B1, thereby being filled into the clearances between the strands 15 inside the insulating coating layer 17.

At this time, the waterproofing agent 21 is also forcibly infiltrated into the clearances between the strands 15 of the exposed core section 18.

The waterproofing agent 21 infiltrated and filled into the clearances between the strands 15 in the exposed core section 18 and inside the insulating coating layers 17A, 17B at the opposite sides of the exposed core section 18 is hardened after the lapse of a specified time.

A waterproof sheet may be wound around the outer circumferential surface of the heat shrinkable tube 20 before or after the hardening of the waterproofing agent 21.

In the waterproof part 11 formed by the above method, the waterproofing agent 21 is filled in the clearances between the strands 15 of the exposed core section 18 and the entire outer circumferential surface of the exposed core section 18 is covered by the waterproofing agent 21, whereby water penetration can be prevented. Further, the waterproofing agent 21 is filled in the clearances between the inner strands 15 close to the slit end surfaces 17A1, 17B1 inside the insulating coating layers 17A, 17B at the opposite sides of the exposed core section 18. In addition, the outer layer tube 20B of the heat shrinkable tube 20 adheres to the outer circumferential surface of the exposed core section 18 filled with the waterproofing agent 21 and those of the adjacent parts of the insulating coating layers 17A, 17B, thereby protecting the waterproof part 11.

Thus, even if the ground terminal 14 at the end of the wire 10 is arranged in a water susceptible area and water enters the wire 10 from the end connected to the ground terminal 14 and penetrates through the clearances between the strands 15 in the wire 10, this water can be reliably stopped by the waterproof part 11 and water penetration to the terminal 13 at the other end connected with the connector C can be prevented.

Figure 5:
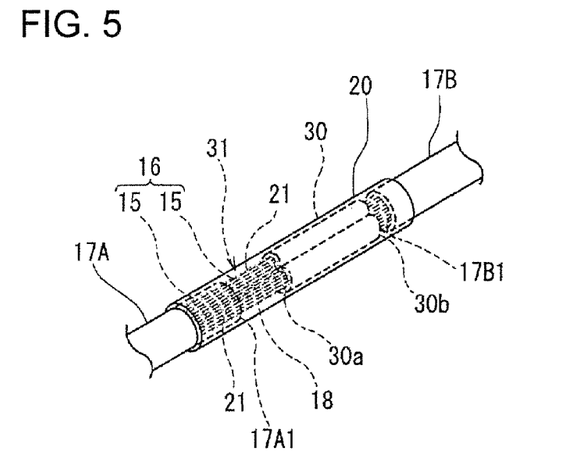
FIG. 5 is a diagram showing a wire including a waterproof part according to a first embodiment.
Figure 6:
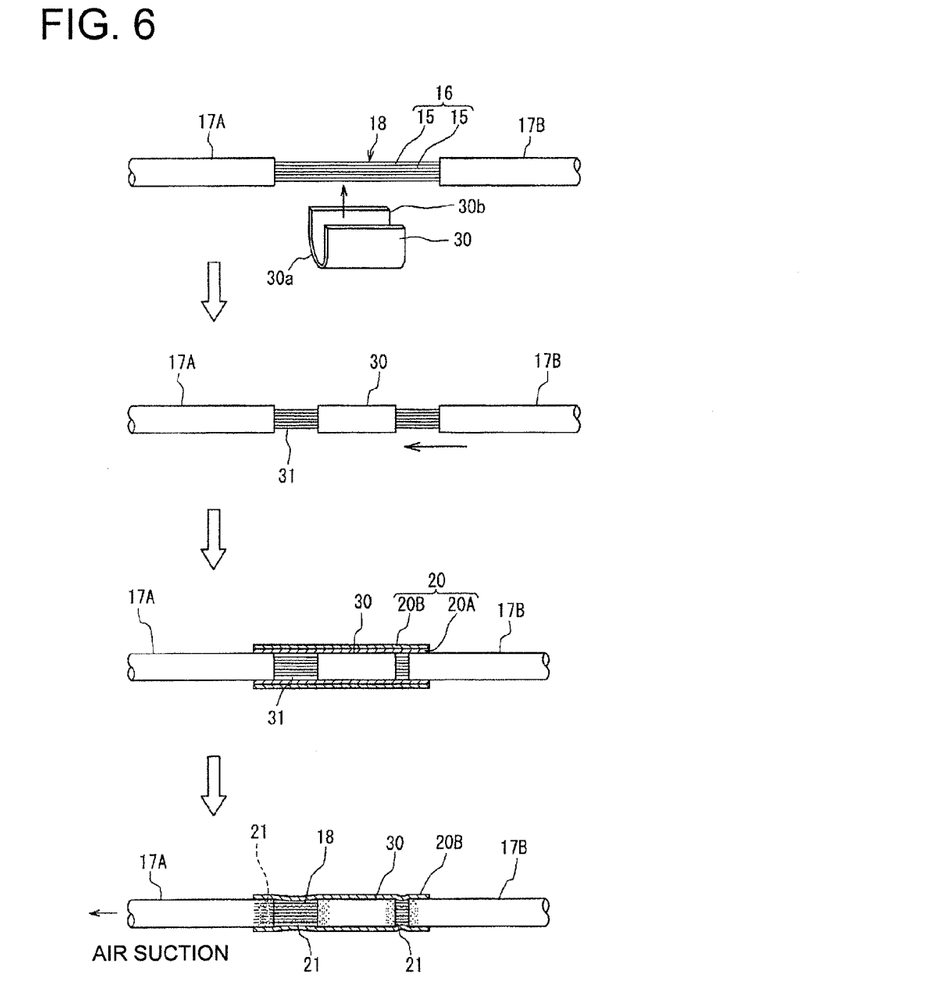
FIG. 6 is a diagram showing a method for forming the waterproof part according to the first embodiment.

FIGS. 5 and 6 show a first embodiment.

In the first embodiment, an intermediate crimping terminal 30 having a U-shaped cross section is crimped and connected to the exposed core section 18.

A waterproofing agent reservoir 31 having a required length is provided between one end 30a of the intermediate crimping terminal 30 in a lengthwise direction and the slit end surface 17A1 of the insulating coating layer 17A.

When the heat shrinkable tube 20 is heated to melt the inner layer tube 20B, thereby bringing the waterproofing agent 21 into a molten state, the molten waterproofing agent 21 first flows into the waterproofing agent reservoir 31 and stays therein.

The waterproofing agent 21 flowed into the waterproofing agent reservoir 31 is infiltrated into clearances between the strands 15 in the waterproofing agent reservoir 31.

If negative pressure is simultaneously introduced from the end (i.e. end connected with the connector connecting terminal 13) of the insulating coating layer 17A as in the first embodiment, the waterproofing agent 21 is sucked from the slit end surface 17A1 of the insulating coating layer 17A.

An exposed core section is formed between another end 30b of the intermediate crimping terminal 30 and the slit end surface 17B1 of the other insulating coating layer 17B. However, since the insulating coating layer 17B is moved from the slit to form the exposed core section 18, the insulating coating layer 17B gradually returns to its initial position and, finally, almost no clearance is present between the other end 30b of the intermediate crimping terminal 30 and the slit end surface 17B1 of the insulating coating layer 17B.

Since the clearances between the strands 15 are first eliminated at a crimped position of the intermediate crimping terminal 30 in the waterproof part 11 according to the first embodiment, even if water penetrates in the clearances inside the insulating coating layer 17B from the ground terminal side, water passing between the strands is blocked at the crimped position of the intermediate crimping terminal 30.

Further, since the waterproofing agent 21 is filled in the clearances between the strands 15 of the exposed core section 18 at the position of the waterproofing agent reservoir 31 between the intermediate crimping terminal 30 and the insulating coating layer 17B and the clearances between the strands 15 inside the insulating coating layer 17 at the side of the connector as in the reference embodiment, water penetration to the connector connected end can be reliably prevented.

Figure 7:
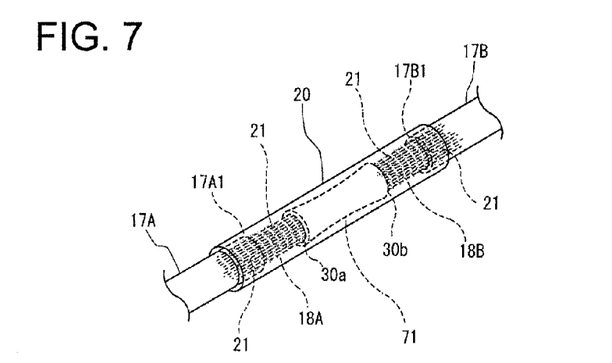
FIG. 7 is a diagram showing a waterproof part according to a second embodiment.
Figure 8:
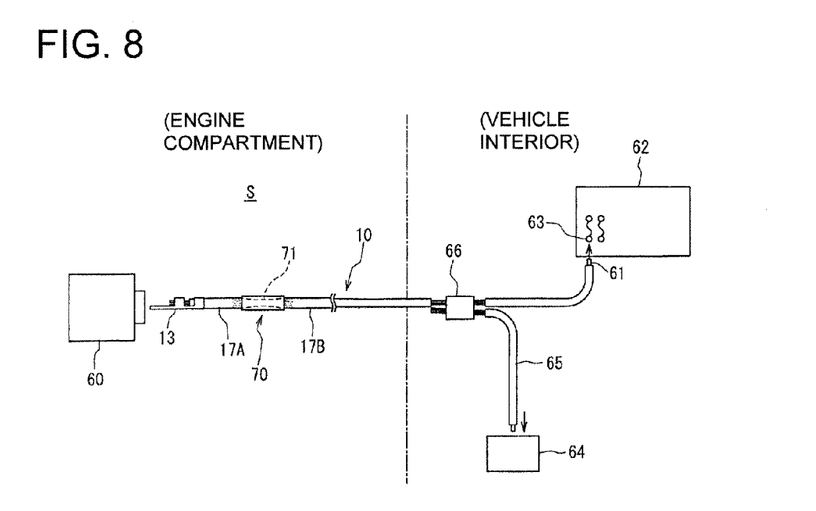
FIG. 8 is a diagram showing a wire arrangement path of a power wire according to the second embodiment, FIGS. 9(A) and (B) are diagrams showing a third embodiment

FIGS. 7 and 8 show a second embodiment.

A wire 10 of the third embodiment is a power wire and has an end on the side of an insulating coating layer 17A connected with a connector connecting terminal 13 to be connected with a unit 60 accommodated in an electrical connection box arranged in a water susceptible area, which is an engine compartment, and the other end connected with a fuse terminal 63 of an electrical connection box 62 arranged in a vehicle interior as shown in FIG. 8. The wire 10 is also spliced to an end of a wire 65 to be connected with another unit 64 in a water free area in the vehicle interior. In the case of forming a waterproof part 70 in a water susceptible area S in the engine compartment between this spliced portion 66 and the connector connecting terminal of the wire 10, a construction shown in FIG. 7 is employed.

In this embodiment, strands 15 of an exposed core section 18 are welded by ultrasonic welding to form a welded potion 71 in which there are no clearances between the strands. A heat shrinkable tube 20 is so mounted as to cover the exposed core section 18 including the welded portion 71 and insulating coating layers 17A, 17B at the opposite sides and negative pressure is introduced from the opposite ends of the wire 10.

In this way, a waterproofing agent 21 is infiltrated into both exposed core sections 18A, 18B formed between the opposite ends of the welded portion 71 and slit end surfaces 17A1, 17B1 of the insulating coating layers 17A, 17 and further infiltrated and filled into the clearances between the strands 15 inside the insulating coating layers 17A, 17B from the slit end surfaces 17A1, 17B1.

If the above construction is employed, water penetration to the spliced portion 66 can be blocked to prevent water penetration to the other wire 65 and no waterproof treatment is necessary at the spliced portion 66 if the waterproof portion 70 is disposed in the water susceptible area S. Further, since water penetration to the terminal 61 connected with the other end of the wire 10 can also be blocked, water penetration into the electrical connection box 62 can be prevented.

In this way, the need for waterproof treatments in the spliced portion 66 and at the terminal 61 at the other end can be obviated by the waterproof treatment in the waterproof part 70.

The welded portion 71 may be welded by resistance welding or solder may be applied thereto.

Since the waterproofing agent penetrates into the insides of the insulating coating layers 17A, 17B at the opposite sides in the waterproof part also in the reference embodiment, this construction is effective also for a wire of a power supply circuit similar to the second embodiment.

If the wire 10 is similarly constructed also in the case of being a signal wire connected with a signal circuit in the electrical connection box 62, it is effective to provide waterproof parts at the opposite sides of the waterproof part 70.

FIG. 9 show a third embodiment.

Figure 9A:
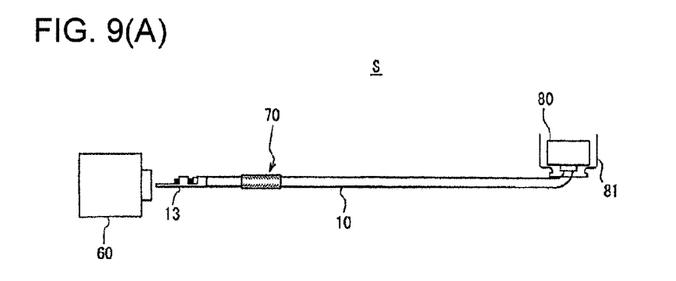
Figure 9B:
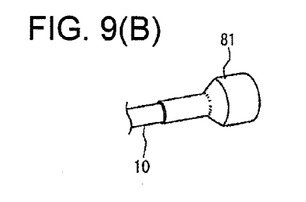

In the third embodiment, an electrical connection box accommodating an electronic control unit 60 and a device (light switch in this embodiment) 80 controlled by the electronic control unit 60 are arranged in a water susceptible area S. If the device 80, which is the light switch, is of the non-waterproof type, the outer surface of a connected part of a wire 10 and that of the device are covered by a protective cover 81 made of vinyl chloride or the like and shown in FIG. 9(B) to prevent water penetration into the device 80 of the non-waterproof type.

Figure 9C:
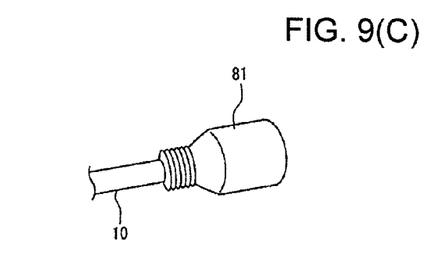
FIGS. 9(C) and 9(D) are diagrams showing a modification of a protective cover.
Figure 9D:
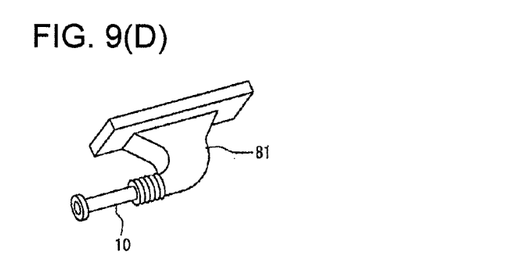

The protective cover 81 may be a boot made of rubber as shown in FIG. 9(C) or 9(D).

Figure 10A:
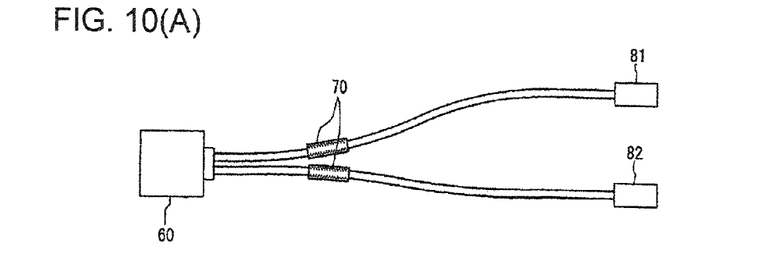
FIGS. 10(A) and 10(B) are diagrams showing a fourth embodiment.
Figure 10B:
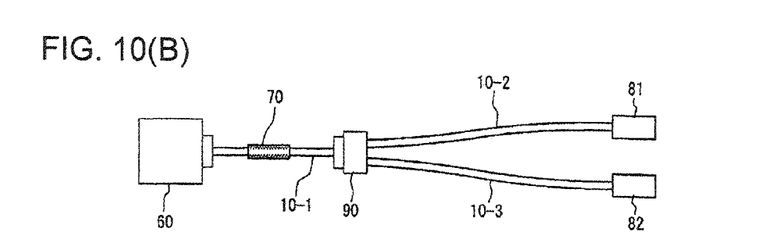

FIGS. 10(A) and 10(B) show a fourth embodiment.

FIG. 10(A) shows a case where a plurality of devices 81, 82 controlled by an electronic control unit 60 are arranged in a water susceptible area and wires 10, 10 connecting the electronic control unit 60 and the respective devices 81, 82 are respectively provided with the above waterproof parts 70, 70.

FIG. 10(B) shows a case where one wire 10-1 connected with the electronic control unit 60 is connected to the plurality of devices 81, 82 via a waterproof connector 90 and wires 10-2, 10-3 and provided with the waterproof part 70 in view of a possibility of water penetration, for example, due to damage of the waterproof connector 90.

A wire having a waterproof part formed by the waterproofing method of the present invention can be applied as a wire to be arranged in a water susceptible area of a car or a motorcycle. Particularly, wires arranged in motorcycles have a high possibility of being arranged in a water susceptible area and a place where a ground terminal can be fixed to a vehicle body is restricted as compared with cars. Therefore, the above wire can be most suitably used as a ground wire to be arranged in a motorcycle.

What is claimed is:

1. A wire waterproofing method for a wire to be arranged in a water susceptible area of a vehicle, the wire having a core made up of a plurality of strands covered by an insulating coating layer, the method comprising:

removing the insulating coating layer in a lengthwise intermediate part of the wire to expose the core, connecting an intermediate crimping terminal to the strands of the exposed core section, by ultrasonic welding, resistance welding or soldering, mounting a heat shrinkable tube on the exposed core section and parts of the insulating coating layer adjacent to the exposed core section, the heat shrinkable tube having an inner layer made of a hot-melt waterproofing agent including a hot-melt polyolefin resin and an outer layer made of a soft resin including an electron-beam cross-linking polyolefin resin, and heating the heat shrinkable tube to melt the hot-melt waterproofing agent of the inner layer and to infiltrate the waterproofing agent into clearances between the strands of the exposed core section, and introducing negative pressure into the inside of the insulating coating layer from an end of the wire to suck the waterproofing agent into the inside of the insulating coating layer and to infiltrate the waterproofing agent also between the strands of the core inside the insulating coating layer.

2. A wire, comprising a waterproof part formed by the waterproofing method of claim 1.

3. A wire to be arranged in a water susceptible area of a vehicle, the wire having a core made up of a plurality of strands covered by an insulating coating layer and being made by a method comprising:

removing the insulating coating layer in a lengthwise intermediate part of the wire to expose the core, connecting an intermediate crimping terminal to the strands of the exposed core section by ultrasonic welding, resistance welding or soldering, mounting a heat shrinkable tube on the exposed core section and parts of the insulating coating layer adjacent to the exposed core section, the heat shrinkable tube having an inner layer made of a hot-melt waterproofing agent and an outer layer, and heating the heat shrinkable tube to melt the hot-melt waterproofing agent of the inner layer and to infiltrate the waterproofing agent into clearances between the strands of the exposed core section, and introducing negative pressure into the inside of the insulating coating layer from an end of the wire to suck the waterproofing agent into the inside of the insulating coating layer and to infiltrate the waterproofing agent also between the strands of the core inside the insulating coating layer, wherein:

the wire is a ground wire having first and second ends, the first end being connected with a ground terminal that is to be fixed to a body panel in a water susceptible area, the waterproof part formed by the waterproofing method is provided at an intermediate position close to a connector connecting portion at the second end of the ground wire, and the negative pressure being introduced from the second end to infiltrate and fill the waterproofing agent between strands inside an insulating coating layer in proximity to the second end.

4. A waterproof structure using a wire including a waterproof part to be arranged in a water susceptible area of a vehicle, the wire having a core made up of a plurality of strands covered by an insulating coating layer and being made by a method comprising:

removing the insulating coating layer in a lengthwise intermediate part of the wire to expose the core, connecting an intermediate crimping terminal to the strands of the exposed core section by ultrasonic welding, resistance welding or soldering, mounting a heat shrinkable tube on the exposed core section and parts of the insulating coating layer adjacent to the exposed core section, the heat shrinkable tube having an inner layer made of a hot-melt waterproofing agent and an outer layer, and heating the heat shrinkable tube to melt the hot-melt waterproofing agent of the inner layer and to infiltrate the waterproofing agent into clearances between the strands of the exposed core section, and introducing negative pressure into the inside of the insulating coating layer from an end of the wire to suck the waterproofing agent into the inside of the insulating coating layer and to infiltrate the waterproofing agent also between the strands of the core inside the insulating coating layer, wherein:

the wire is a power wire, a signal wire or a ground wire having one end connected with a connector connecting terminal and spliced to another wire in a water free area, a terminal is connected with an end of the spliced other wire, a waterproof part is provided at an intermediate position between a spliced position and the end connected with the terminal, and the waterproofing agent is filled into the exposed core section of the waterproof part and between the strands inside the insulating coating layer parts at opposite sides of the exposed core section.

5. A waterproof structure using a wire including a waterproof part to be arranged in a water susceptible area of a vehicle, the wire having a core made up of a plurality of strands covered by an insulating coating layer and being made by a method comprising:

removing the insulating coating layer in a lengthwise intermediate part of the wire to expose the core, connecting an intermediate crimping terminal to the strands of the exposed core section by ultrasonic welding, resistance welding or soldering, mounting a heat shrinkable tube on the exposed core section and parts of the insulating coating layer adjacent to the exposed core section, the heat shrinkable tube having an inner layer made of a hot-melt waterproofing agent and an outer layer, and heating the heat shrinkable tube to melt the hot-melt waterproofing agent of the inner layer and to infiltrate the waterproofing agent into clearances between the strands of the exposed core section, and introducing negative pressure into the inside of the insulating coating layer from an end of the wire to suck the waterproofing agent into the inside of the insulating coating layer and to infiltrate the waterproofing agent also between the strands of the core inside the insulating coating layer, wherein:

the wire is a signal wire, a power wire or a ground wire having first and second ends connected respectively with first and second connector connecting terminals, the first connector connecting terminal being connected with an electronic control unit, the second connector connecting terminal being a device controlled by the electronic control unit and the electronic control unit and the device being arranged in a water susceptible area, and the waterproof part formed by the waterproofing method is provided at an intermediate position of the wire close to the electronic control unit and a waterproof cover is mounted on the device and a connecting portion of the wire.

\* \* \* \* \*